United States Patent
Quartararo

[19]
[11] Patent Number: 6,102,337
[45] Date of Patent: *Aug. 15, 2000

[54] SPACECRAFT ATTITUDE CONTROL WITH GIMBALED THRUSTERS

[75] Inventor: Richard Quartararo, Laguna Niguel, Calif.

[73] Assignee: Hughes Electronics Corporation, El Segundo, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/577,571

[22] Filed: Dec. 22, 1995

[51] Int. Cl.$^7$ .................................................. B64G 1/26
[52] U.S. Cl. .............................................. 244/169; 701/13
[58] Field of Search .............................. 244/158 R, 164, 244/169, 170, 171, 172; 701/13

[56] References Cited

U.S. PATENT DOCUMENTS

| | | |
|---|---|---|
| 2,396,568 | 3/1946 | Goddard . |
| 3,073,630 | 1/1963 | Kuhn, Jr. . |
| 3,188,024 | 6/1965 | Schneider . |
| 3,231,224 | 1/1966 | Koelle ................................. 244/169 X |
| 3,532,304 | 10/1970 | Pyptiuk ................................. 244/172 |
| 3,984,072 | 10/1976 | Von Pragenau et al. ........... 244/171 X |
| 4,786,019 | 11/1988 | Uken ..................................... 244/169 |
| 4,955,559 | 9/1990 | Kaminskas .......................... 244/172 X |
| 4,961,551 | 10/1990 | Rosen ................................. 244/172 X |
| 5,020,746 | 6/1991 | Anzel ................................... 244/169 |
| 5,098,041 | 3/1992 | Uetrecht ............................. 244/172 X |
| 5,251,855 | 10/1993 | Kaelsch ............................... 244/172 |
| 5,349,532 | 9/1994 | Tilley et al. ....................... 244/171 X |
| 5,383,631 | 1/1995 | Mazzini ................................ 244/169 |
| 5,595,360 | 1/1997 | Spitzer ................................. 244/158 R |

OTHER PUBLICATIONS

"Attitude Control of Solar Electric Spacecraft by Thruster Gimballing", Elbert L. Marsh, J. Spacecraft vol. 11, No. 11, Nov. 1974, pp. 737–738.

"Thruster Subsystem Module for Solar Electric Propulsion", G. Richard Sharp, J. Spacecraft vol. 13, No. 2, Feb. 1976, pp. 106–110.

*Primary Examiner*—Galen L. Barefoot
*Attorney, Agent, or Firm*—T. Gudmestad; M. W. Sales

[57] ABSTRACT

A spacecraft control system having a spacecraft with a gimbaled thruster attached thereto. An actuator is operationally attached to the gimbaled thruster to control the angled position of the gimbaled thruster in two orthogonal directions. A position control system is provided which sends a control signal to the actuator which moves the gimbaled thruster to an angled position in response to the control signal, wherein the angled position of the gimbaled thruster controls the attitude and orbital velocity of the spacecraft.

8 Claims, 4 Drawing Sheets

SPACECRAFT ATTITUDE CONTROL WITH GIMBALED THRUSTERS

BACKGROUND OF THE INVENTION

In the past, various methods have been used to control either the attitude or orbital velocity of a spacecraft or space vehicle. For example, it is well known to use launch vehicles, such as a space shuttle, with gimbaled thrusters for velocity control. In addition, chemical thrusters have been body-fixed to the spacecraft in order to perform a number of functions. One function performed is to precess attitude by timing chemical thruster pulses relative to an inertial reference, such as the sun or earth. Such body-fixed chemical thrusters have been used to control the spin rate and attitude of a spacecraft during thrusting for orbit raising.

While many of the known methods for controlling attitude or orbital velocity have performed adequately, there is room for improvement. In particular, prior methods of control require separate thrusters to perform attitude control and orbital velocity control. In addition, prior methods of control require expensive chemical propulsion systems to perform attitude and orbital velocity control.

SUMMARY OF THE INVENTION

The present invention provides a thruster control system for a satellite which can use a single set of thrusters to perform both attitude and orbital velocity control.

In particular, the present invention concerns a spacecraft control system for a spacecraft having a gimbaled thruster attached thereto. An actuator is operationally attached to the gimbaled thruster so as to control the angled position of the gimbaled thruster in two orthogonal directions. A position control system is provided which sends a control signal to the actuator which moves the gimbaled thruster to an angled position in response to the control signal, wherein the angled position of the gimbaled thruster controls the attitude and orbital velocity of the spacecraft.

Another aspect of the present invention concerns a method of controlling the attitude and orbital velocity of a spacecraft having an electronic thruster. The method contains the steps of (1) measuring the position of the spacecraft; (2) comparing the measured position of the spacecraft with a desired position of the spacecraft; and (3) adjusting the angled position of the thruster in two orthogonal directions in response to the comparison of the measured and desired position of the spacecraft in order to move the spacecraft to a desired attitude and a desired orbital velocity.

The above-described spacecraft control system of the present invention needs only two thrusters to perform both three-axis attitude and orbital velocity corrections. The above-disclosed system eliminates the need for expensive chemical thrusters to perform the tasks of attitude and orbital velocity corrections.

The foregoing features and advantages of the present invention will be further understood upon consideration of the following detailed description of the invention taken in conjunction with the accompanying drawings, in which:

DESCRIPTION OF THE PREFERRED EMBODIMENT

Figure 1:
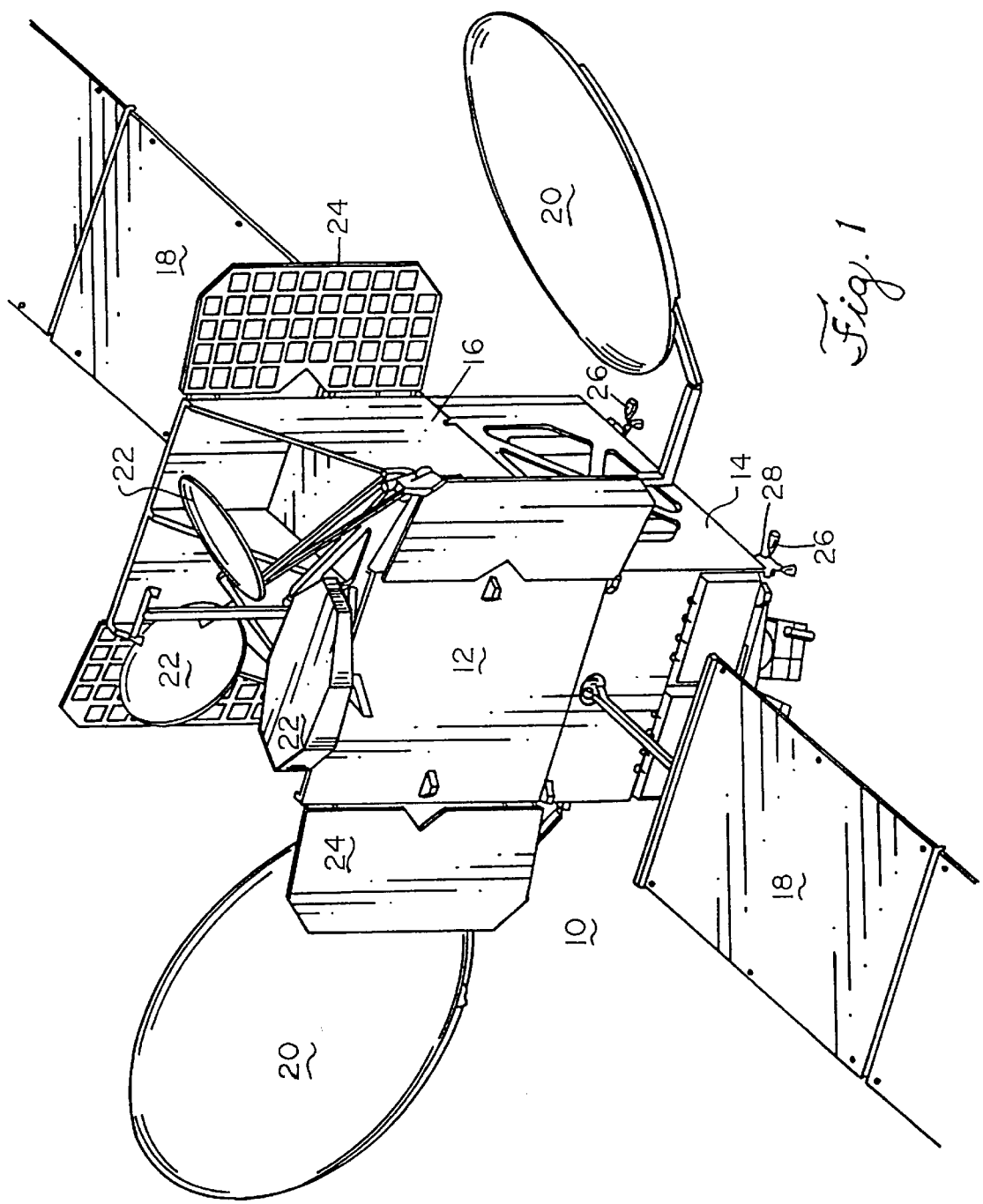
FIG. 1 shows a perspective view of a spacecraft capable of utilizing the gimbaled thruster of the present invention.
Figure 2:
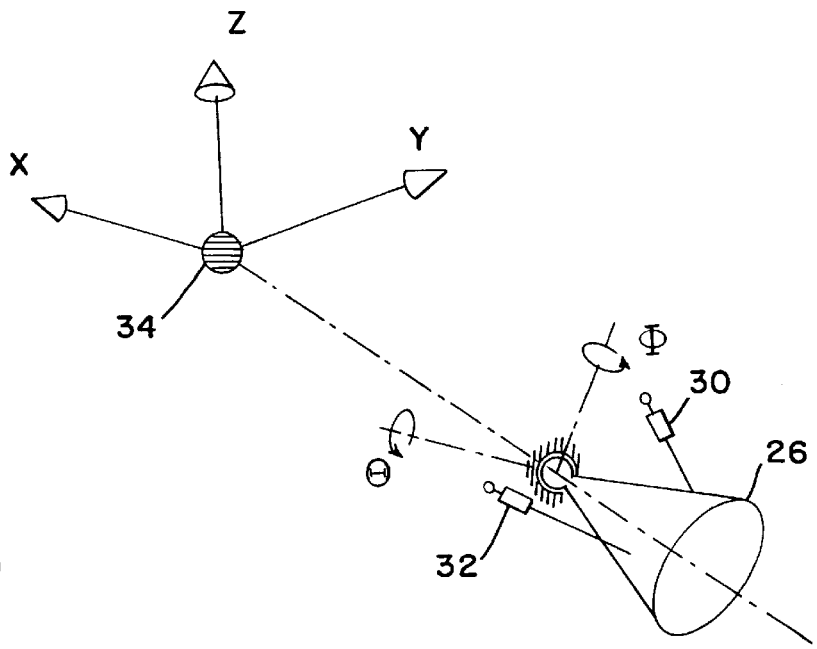
FIG. 2 shows a gimbaled thruster of the present invention.

A spacecraft or satellite 10 capable of employing a spacecraft control system for controlling the attitude and orbital velocity of a spacecraft according to the present invention is shown in FIGS. 1–2 where like elements are denoted by like numerals. Satellite 10 has a spacecraft body 12 which includes a lower bus module 14 and an upper payload module 16. Attached to the aft end of the lower bus module 14 are a plurality of engines which will be discussed in detail later. Lower bus module 14 contains fuel tanks (not shown) and various power and control modules which operate the engines and power the payload module 16. Bus module 14 further includes a pair of solar panels 18 which convert sunlight into electricity which is sent to batteries (not shown) located on the bus module 14. Bus module 14 also has one or more antennae 20 and reflectors 22, which receive signals from a ground station on Earth which are used to control the satellite 10.

Satellite 10 contains a variety of electronic equipment which may contain a number of sensors (not shown). The electronic equipment processes information gathered by the sensors and sends the processed information back to the ground station via antennae. Payload module 16 further includes heat radiators 24 which emit heat generated by the satellite 10.

As seen in FIGS. 1 and 2, spacecraft or satellite 10 has one or more thrusters 26 attached thereto via a gimbaled mechanism 28 and actuators 30 and 32. Actuators 30 and 32 are operationally attached to each gimbaled thruster 26 so as to control the angled position of the gimbaled thruster 26 in two orthogonal directions. Actuator 30 changes length to rotate thruster 18 through angle $\Phi$ and actuator 32 changes length to rotate thruster 26 through angle $\theta$. Examples of gimbaled mechanism 28 are well known in the art. Each thruster 26 preferably is an electronic thruster, such as a xenon ion propulsion thruster.

Thrusters 26, gimbaled mechanism 28 and actuators 30, 32 may be used to control both three-axis and spin stabilized spacecraft. Three-axis spacecraft are controlled by gimbaling a thruster(s) to produce a torque applied directly to the axis of rotation to be controlled. Spin stabilized spacecraft are controlled by producing the needed torques to reorient the spacecraft's momentum vector, damp nutation relative to the momentum vector (i.e., to cause the spacecraft's spin axis to become aligned with momentum vector), and to adjust spin rate. In spin stabilized applications, a control system continuously adjusts the thruster's orientation relative to the spacecraft as it spins in order to produce the inertially referenced torque needed for angular momentum reorientation; and gimbaling also produces body referenced torques for nutation damping and spin rate adjustment.

Figure 3:
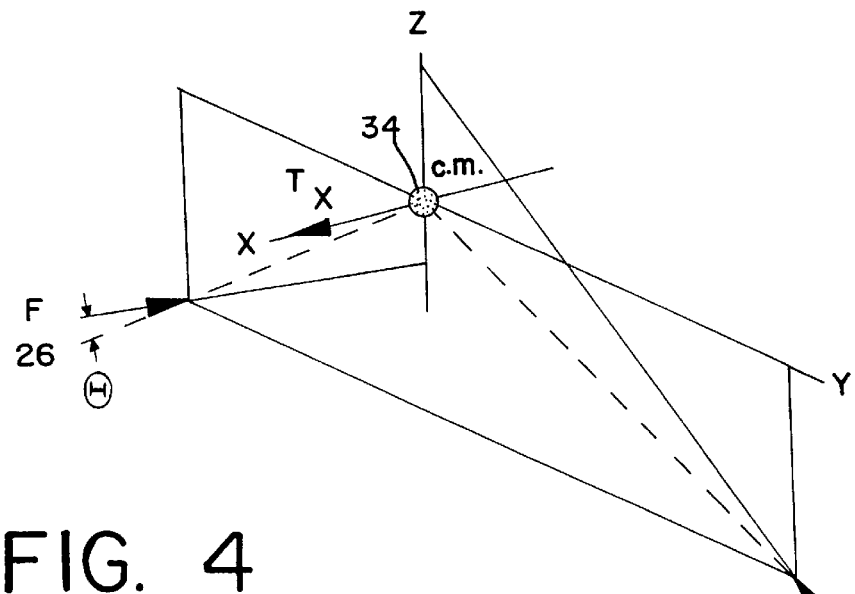
FIG. 3 schematically shows how two thrusters can provide both Z-axis translational acceleration and X-axis torques to a spacecraft of the present invention.
Figure 4:
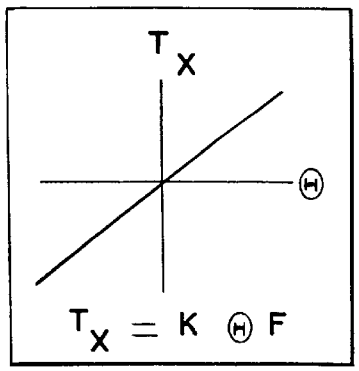
FIG. 4 graphically shows the linear relationship between the X-axis torque shown in FIG. 3 and the angular position, $\theta$, of the thruster relative to x-axis passing through the center of mass of the spacecraft.
Figure 5:
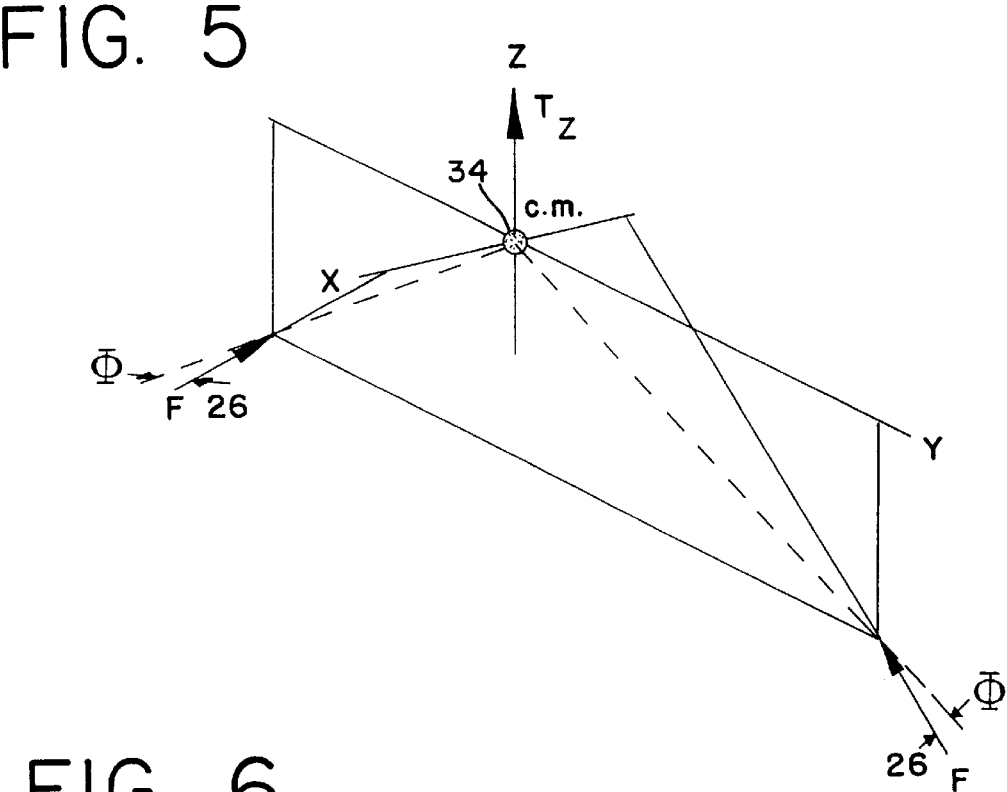
FIG. 5 schematically shows how two thrusters can provide both Z-axis translational acceleration and Z-axis torques to a spacecraft of the present invention.
Figure 6:
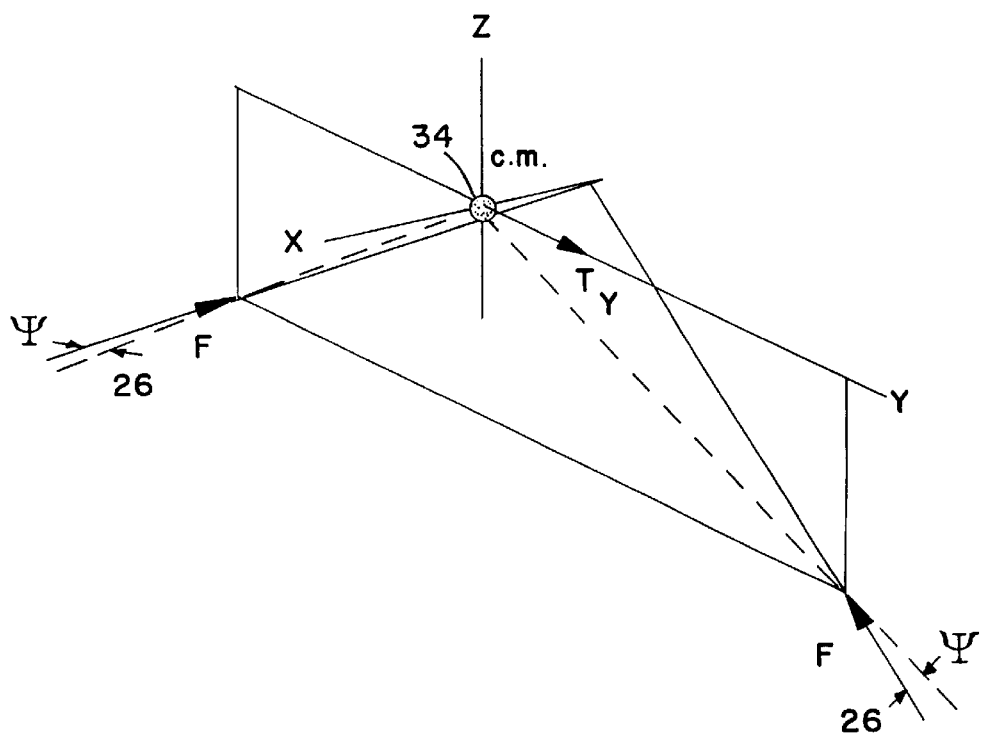
FIG. 6 schematically shows how two thrusters can provide both Z-axis translational acceleration and Y-axis torques to a spacecraft of the present invention.

As shown in FIGS. 3–6, the attitude and orbital velocity of a three-axis spacecraft 10 can be controlled by angling one or more of the thrusters 26. In FIGS. 3, 5 and 6, two thrusters 26 are applying equal thrust F and are symmetrically located relative to the X–Z plane. If the lines of force for each thruster 26 are aligned with the center of mass 34 of the spacecraft 10, then the spacecraft 10 will only be subject to a net thrust or force in the Z-direction. This allows one to only control the velocity of the spacecraft 10 in the Z-direction. However, as shown in FIG. 3, if the lines of force for each thruster 26 are angled relative to the X-axis by an amount θ, then a torque, $T_X$, is produced about the X-axis and having a magnitude of 2Fdsinθ, where F is the magnitude of the thrust produced by thruster 26 and d is the distance from thruster 26 to the center of mass 34. For small angles θ, the magnitude of the applied torque, $T_X$, varies linearly as a function of θ - - - $T_X$=kθF, where k=2d. Note that in this example, the thrusters 26 have been angled so that they produce a net thrust in the Z-direction and produce a torque along the X-direction. Thus, thrusters 26 are able to produce both a force to correct orbital velocity (Z-axis thrust) and a torque to correct spacecraft attitude ($T_x$).

Figure 7:
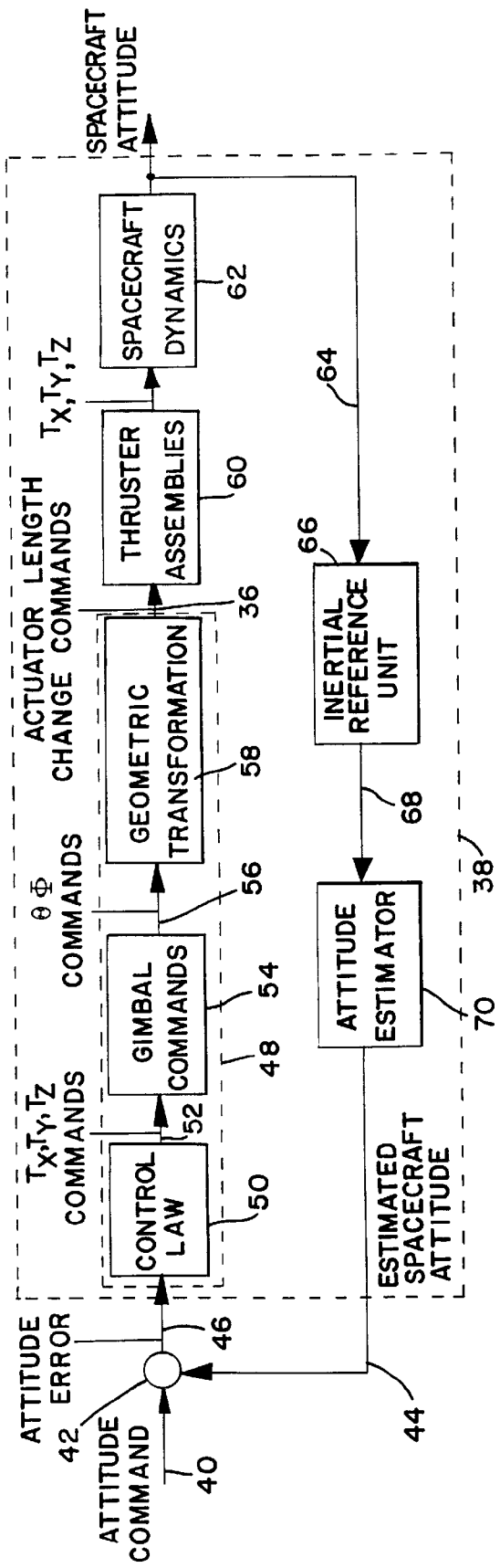
FIG. 7 shows a block diagram for a spacecraft attitude control system for the spacecraft of FIG. 1.

The above-description of the production of torque in the X-direction is equally applicable to when the thrusters 26 are angled relative to the Y-axis by an amount Φ, or angled relative to the Z-axis by an amount Ψ, as shown in FIGS. 5 and 6, respectively. For example, angling thrusters 26 relative to the Y-axis by an amount Φ so that the thrust lines from each thruster intersect the X-axis at points separate from each other by the YZ plane a net thrust along the Z-axis and a Z-axis torque, $T_Z$, of magnitude 2Fdsin Φ as shown in FIG. 5. Likewise, in order to control the attitude in the Z-direction and the orbital velocity angling the thrusters 26 relative to the Y-axis by an amount therefor so that the lines of force intersect the X-axis on the same side of the YZ plane will result in a net thrust in the Z-direction and a torque, $T_Y$ about the Y-axis having a magnitude of 2Fdsin Ψ as shown in FIG. 6. The thrusters 26 are positioned so that they are angled with respect to the X and Y directions by amounts θ and Φ, respectively, which will produce the desired attitude and orbital velocity corrections. As shown in FIGS. 2 and 7, the angular directions of the thrusters 26 are controlled by control signals 36 which are sent to actuators 30, 32 by position control system 38, which preferably is composed of one or more microprocessors. When each actuator 30, 32 receives its respective control signal 36, actuator 30, 32 moves the gimbaled thruster 26 to an angled position so that each gimbaled thruster 26 controls the attitude and orbital velocity of the spacecraft 10.

As shown in FIG. 7, control of the attitude of the spacecraft 10 is accomplished by sending an attitude command signal 40 from ground control on Earth or from another spacecraft which represents a desired attitude for the spacecraft 10. A comparator 42 then compares the attitude command signal 40 with an estimated spacecraft attitude signal 44 generated by position control system 38. The estimated spacecraft attitude signal 44 is an on-board estimate of the attitude of the spacecraft 10 when the comparator 42 receives the attitude command signal 40. If the comparator 42 determines that there is no difference in the values for the attitude command signal 40 and the estimated spacecraft attitude signal 44, then no change in the direction of the thrusters 26 is needed at that time. However, if the signals 40, 44 have unequal values, then the comparator 42 produces an error signal 46 which has a value equal to the difference between the value of the attitude command signal 40 and the estimated spacecraft attitude signal 44.

The error signal 46 is then sent to a control signal generator 48 which generates from a torque signal generator 50 one or more torque signals representative of a satellite/body-fixed torque necessary to correct the error signal 46 so as to have a value of zero. The torque signals 52 are then sent to a gimbal command generator 54 which generates control signals 56 proportional to the angular displacements θ, Φ needed to produce the satellite body freed torque. The angles are computed based on the geometry shown in FIGS. 3–6. Control signals 56 are manipulated within transformation stage 58 which applies well known geometrical principles to determine the control signals 36 representative of the length changes of actuators 30 and 32 needed to produce θ and Φ. The control signals 36 are then sent to the thruster assemblies 60 (including gimbaled mechanism 28, actuators 30 and 32 together with any local control system needed to ensure that the actuators 30 and 32 actually implement the length change commands 36) which angle one or more of the thrusters 26 so that torques $T_X$, $T_Y$, $T_Z$ are applied to the spacecraft 10 to correct the attitude. The torques $T_X$, $T_Y$, $T_Z$ are also used in the spacecraft dynamics module 62 which determines from the inertial and geometric properties of the spacecraft 10 stored therein generates a signal 64 representative of how the spacecraft 10 will rotate in response to torques $T_X$, $T_Y$, $T_Z$ produced by the thruster assemblies 60.

The movement of the spacecraft 10 is then estimated from signal 64 by a spacecraft position generator, such as an inertial reference unit 66, which generates a spacecraft position signal 68 which is representative of the position of the spacecraft 10 in response to the thrusters 26 receiving control signals 36. The spacecraft position signal 68 is then sent to an attitude estimator 70 which generates the estimated spacecraft attitude signal 44.

As explained above, the present invention may be applied to three-axis (non-spinning) stabilized spacecraft. In three-axis applications control laws are configured to compute torques to be applied about each of three body-fixed axes to control rotation about corresponding axes. For example, the value of torque in the x direction needed to control rotation about x is generated by the control system.

The present invention may be applied to spin stabilized spacecraft as well. In particular, control of spin stabilized spacecraft may be achieved by, for example, replacing the attitude command signal 40 with two angles that define the desired inertial orientation of the spacecraft's body-fixed spin axis, plus a desired nutation angle (angle between the spin axis and the spacecraft's angular momentum vector, which is usually set to zero) and a desired spin rate. In such a case, the attitude estimator 70 is configured to estimate current values of the commanded variables, and the control signal generator 48 is configured to produce the body torque commands needed to cause the momentum vector to point in the direction specified by the two commanded angles, nutation to be eliminated (thus, making the spin axis point in the direction of the momentum vector), and spin rate to equal its desired (commanded) value. Each thruster would undergo complex motions consisting of the summation of three simpler motions: Each thruster would oscillate at a spin frequency to produce the inertially referenced torque needed to reorient the angular momentum vector; each thruster would oscillate at body nutation frequency to damp nutation; and each thruster would orient to produce a body-fixed torque along the spin axis.

The gimbaled thruster control system described above enables spacecraft outfitted with two low thrust ion thrusters, as illustrated in FIGS. 1 and 2, to apply very long duration (many hours or days) forces along one spacecraft axis, while simultaneously controlling the spacecrafts orientation as needed to point the net thrust vector and point spacecraft components in a desired direction (e.g., point solar arrays toward the sun). Furthermore, the control system is applicable to both three-axis and spin stabilized satellites.

In summary, the present invention provides an efficient and economical system for controlling the attitude and orbital velocity of the spacecraft. In particular, the present invention uses a single set of thrusters to control both attitude and orbital velocity of the spacecraft.

The foregoing description is provided to illustrate the invention, and is not to be construed as a limitation. Numerous additions, substitutions and other changes can be made to the invention without departing from its scope as set forth in the appended claims.

I claim:

1. A spacecraft control system for a spacecraft, said system comprising:
   a spacecraft with a gimbaled thruster attached thereto;
   a plurality of linear actuators operationally attached to said gimbaled thruster so as to control the angled position of said gimbaled thruster in two orthogonal directions;
   a position control system which sends a control signal to said plurality of linear actuators which moves said gimbaled thruster to an angled position in response to said control signal, wherein said angled position of said gimbaled thruster simultaneously controls the attitude and orbital velocity of said sacecraft,
      wherein said position control system is configured for a spinning spacecraft, with the thruster gimbaled so as to produce inertial torques to reorient the angular momentum vector and body referenced torques to damp nutation and adjust spin speed.

2. The spacecraft control system of claim 1, wherein said gimbaled thruster comprises an electronic thruster.

3. The spacecraft control system of claim 1 further comprising:
   a second gimbaled thruster attached to said spacecraft;
   a second plurality of linear actuators operationally attached to said second gimbaled thruster so as to control the angled position of said second gimbaled thruster in two orthogonal directions;
   wherein said position control system sends a second control signal to said second plurality of linear actuators which moves said second gimbaled thruster to an angled position in response to said second control signal, wherein said angled position of said second gimbaled thruster simultaneously controls the attitude and orbital velocity of said spacecraft.

4. The spacecraft control system of claim 1, wherein said position control system comprises:
   a comparator which receives (1) an attitude command signal representing a desired attitude for said spacecraft and (2) an estimated spacecraft attitude signal generated by said position control system which is an estimate of the attitude of said spacecraft when said comparator receives said attitude command signal, said comparator producing an error signal which has a value equal to the difference between the values of said attitude command signal and said estimated spacecraft attitude signal; and
   a control signal generator which generates said control signal in response to said difference signal.

5. The spacecraft control system of claim 4, wherein said position control system further comprises:
   a spacecraft position generator which generates a spacecraft position signal which is representative of the position of said spacecraft in response to said actuator receiving said control signal;
   an attitude estimator which receives said spacecraft position signal and generates said estimated spacecraft attitude signal.

6. The spacecraft control system of claim 4, wherein said position control system further comprises:
   a torque signal generator which generates a torque signal representative of a satellite-fixed torque necessary to correct said error signal so as to have a value of zero;
   a gimbal command generator which receives said torque signal and generates said control signal.

7. A method of controlling the attitude and orbital velocity of a spacecraft having an electronic thruster, said method comprising the steps of:
   providing a plurality of linear actuators operationally attached to said electronic thruster so as to control the angled position of said electronic thruster;
   measuring the attitude of said spacecraft;
   comparing said measured attitude of said spacecraft with a desired attitude of said spacecraft;
   adjusting the angled position of said thruster in two orthogonal directions using said plurality of linear actuators in response to said comparison of said measured and desired position of said spacecraft in order to simultaneously move said spacecraft to a desired attitude and a desired orbital velocity;
   wherein said adjustment step comprises gimbaling said thruster so as to produce inertial torques to reorient the angular momentum vector and body referenced torques to damp nutation and adjust spin speed.

8. The method of claim 7, further comprising the step of:
   adjusting the angled position of a second thruster attached to said spacecraft in response to said comparison of said measured and desired orientation of said spacecraft in order to move said spacecraft to said desired attitude and a desired orbital velocity.

* * * * *